United States Patent [19]

Millward et al.

[11] 4,004,472
[45] Jan. 25, 1977

[54] VEHICLE DIFFERENTIAL UNITS

[75] Inventors: Thomas Hughes Millward, Sutton Coldfield; Terence Leslie Eustace, Birmingham; Barrie Arthur Thompson, Aldridge, near Walsall, all of England

[73] Assignee: GKN Transmissions Limited, Birmingham, England

[22] Filed: Jan. 8, 1974

[21] Appl. No.: 431,790

[30] Foreign Application Priority Data

June 23, 1973 United Kingdom ............. 29928/73

[52] U.S. Cl. ................................................ 74/713
[51] Int. Cl.² ....................................... F16H 1/40
[58] Field of Search ................ 74/713, 710, 710.5, 74/711; 180/24.09, 88

[56] References Cited

UNITED STATES PATENTS

| | | | |
|---|---|---|---|
| 1,946,051 | 2/1934 | Alden | 74/713 |
| 2,351,234 | 6/1944 | Schon | 74/710 X |
| 2,561,335 | 7/1951 | Buckendale | 74/713 |
| 2,609,710 | 9/1952 | Osborn | 74/713 |
| 3,310,999 | 3/1967 | Griffith | 74/710 |
| 3,605,965 | 9/1971 | Thomas et al. | 74/710.5 |

FOREIGN PATENTS OR APPLICATIONS

| | | | |
|---|---|---|---|
| 452,715 | 11/1948 | Canada | 74/710 |
| 683,836 | 12/1952 | United Kingdom | 74/710 |

Primary Examiner—Samuel Scott
Assistant Examiner—Frank H. McKenzie, Jr.
Attorney, Agent, or Firm—Spencer & Kaye

[57] ABSTRACT

A vehicle differential unit in which an input or drive pinion is mounted on a shaft which is supported on two axially spaced bearing assemblies carried by a housing which encloses the unit. The housing is provided with first and second apertures, the second aperture, which is provided with a detachable cover, being of sufficient size to pass the drive pinion and the first aperture not allowing the passage therethrough of the drive pinion. A first bearing assembly, which is supported in the first aperture, supports a first end portion of the shaft with which a vehicle drive shaft is normally associated and a second bearing assembly, located on the other side of the drive pinion from the first bearing assembly, supports a second end portion of the shaft which is located within the housing adjacent a crown wheel of the differential unit. The second bearing assembly is mounted on a bearing support which is separate from the housing and is secured to an abutment surface on the housing by releasable means so that the bearing support can be inserted into the housing through the second aperture and, after the first end portion of the pinion shaft has been received in the first bearing assembly, the second bearing assembly can be located on the second end portion of the shaft and the releasable means then engaged to secure the bearing support to the housing.

12 Claims, 5 Drawing Figures

VEHICLE DIFFERENTIAL UNITS

BACKGROUND OF THE INVENTION

1. Field of Invention

This invention relates to vehicle differential units in which drive is transmitted from an input or drive pinion to a crown wheel and associated bevel pinions mounted in a cage carried by the crown wheel and hence to two output bevel gears which mesh with the bevel pinions and which are arranged to be attached to two output or half-shafts which extend one on each side of the crown wheel. The invention is exclusively concerned with such differential units in which the drive pinion is "straddle mounted".

The term "straddle mounted" as used throughout this specification is intended to cover differential units in which the drive pinion is mounted on a shaft supported on two axially spaced bearing assemblies carried by a housing which encloses the differential, the bearing assemblies being positioned one on each side of the drive pinion and comprising a first or outer bearing assembly supporting a first or outer end portion of the shaft with which the vehicle drive shaft is normally associated and a second or inner bearing assembly supporting a second or inner end portion of the shaft which is located within the housing adjacent the crown wheel.

2. Description of Prior Art

Heretofore, the inner bearing assembly has been supported on an internal flange which is an integral part of the housing of the differential unit. This has posed several problems as it has been found necessary, in order to assemble such a unit, to mount the outer bearing assembly in a detachable cartridge which is received in an aperture in the housing, the outer diameter of the cartridge being at least equal to the largest diametral measurement of the drive pinion in order that, with the drive pinion, shaft, outer bearing assembly and cartridge as an assembled unit, the drive pinion and inner portion of the shaft can be inserted into the housing via the aperture in which the cartridge is received. The procedure employed for mounting a drive pinion in such a unit is to press the inner bearing assembly into an aperture provided in the internal flange and then to insert the drive pinion, shaft, outer bearing assembly and cartridge as a unit into the aperture in the casing designed to receive the cartridge, while ensuring that the inner end portion of the shaft is received in the inner bearing assembly.

While such units have proved satisfactory in service, they are heavier than is necessary from a purely structural point of view, as the outer diameter of the cartridge is determined by the size of the drive pinion and is thus larger than is required in order to give adequate strength, It is an object of the present invention to provide an improved form of vehicle differential unit employing a straddle mounted drive pinion.

SUMMARY OF THE INVENTION

According to the present invention we provide a vehicle differential units comprising a housing, first and second apertures in the housing, the second aperture being larger than the first aperture, an abutment surface on the housing located between said apertures and facing said second aperture; a removable cover for the second aperture; differential gearing in the housing and comprising a drive pinion mounted on a pinion shaft and spaced from the ends thereof so that the pinion is located between first and second end portions of the shaft, a crown wheel meshing with the drive pinion, a cage secured to the crown wheel, bevel pinions carried by the carrier and output bevel gears meshing with the bevel pinions; a first bearing assembly in said first aperture and in which the first end portion of the pinion shaft is supported, the first aperture being of insufficient size to allow the drive pinion to pass therethrough so that the first end portion of the shaft can only be mounted in said bearing by inserting the pinion and shaft into the housing through the second aperture which is of a size sufficient to pass the drive pinion; a second bearing assembly for the second end portion of the shaft; a bearing support separate from the housing and having an aperture which receives said second bearing assembly and an abutment surface facing said first aperture and engaged with said abutment surface on the housing, said engaged abutment surfces being located in an arc around the rotary axis of the drive pinion shaft; releasable means securing the bearing support to the housing with said abutment surfaces in engagement so that the bearing support can be inserted into the housing through the second aperture and, after the first end portion of the pinion shaft has been received in the first bearing assembly, the second bearing assembly can be located on the second end portion of the shaft and the releasable means then engaged to secure the bearing support to the housing.

The bearing support may be of a segmentally-shaped, substantially flat form, the outer peripheral portion of the support being secured to the housing. Such a support may comprise an arcuate portion and an annular portion joined together by a number of ribs, the arcuate portion being secured to the housing and the annular portion carrying the second bearing assembly.

Alternatively, the component which carries the second bearing assembly may comprise two interconnected portions axially spaced of the pinion shaft, one portion carrying the second bearing assembly and the other portion being secured to the housing. The portions may be annular in form joined together by a number of ribs, the first annular portion carrying the second bearing assembly and the second annular portion being secured to the housing.

In a component as described in the preceding paragraph, the axial spacing between the portions is preferably arranged to be such that the first annular portion carries the second bearing assembly on one side of the drive pinion and the second annular portion is secured to the housing on the other side of the drive pinion.

The bearing support is preferably made from cast iron or some other suitable ferrous material. If the housing of the vehicle differential unit is made from light alloy, the first bearing assembly may be carried by an insert of cast iron or some other suitable ferrous material provided as part of the housing. The bearing suport may be secured to the insert if desired, in order to minimize the effects of differential thermal expansion during operation of the unit.

BRIEF DESCRIPTION OF THE DRAWINGS

Several embodiments of the present invention will now be described by way of example with reference to FIGS. 1 to 5 of the accompanying drawings in which.

DESCRIPTION OF PREFERRED EMBODIMENTS

Figure 1:
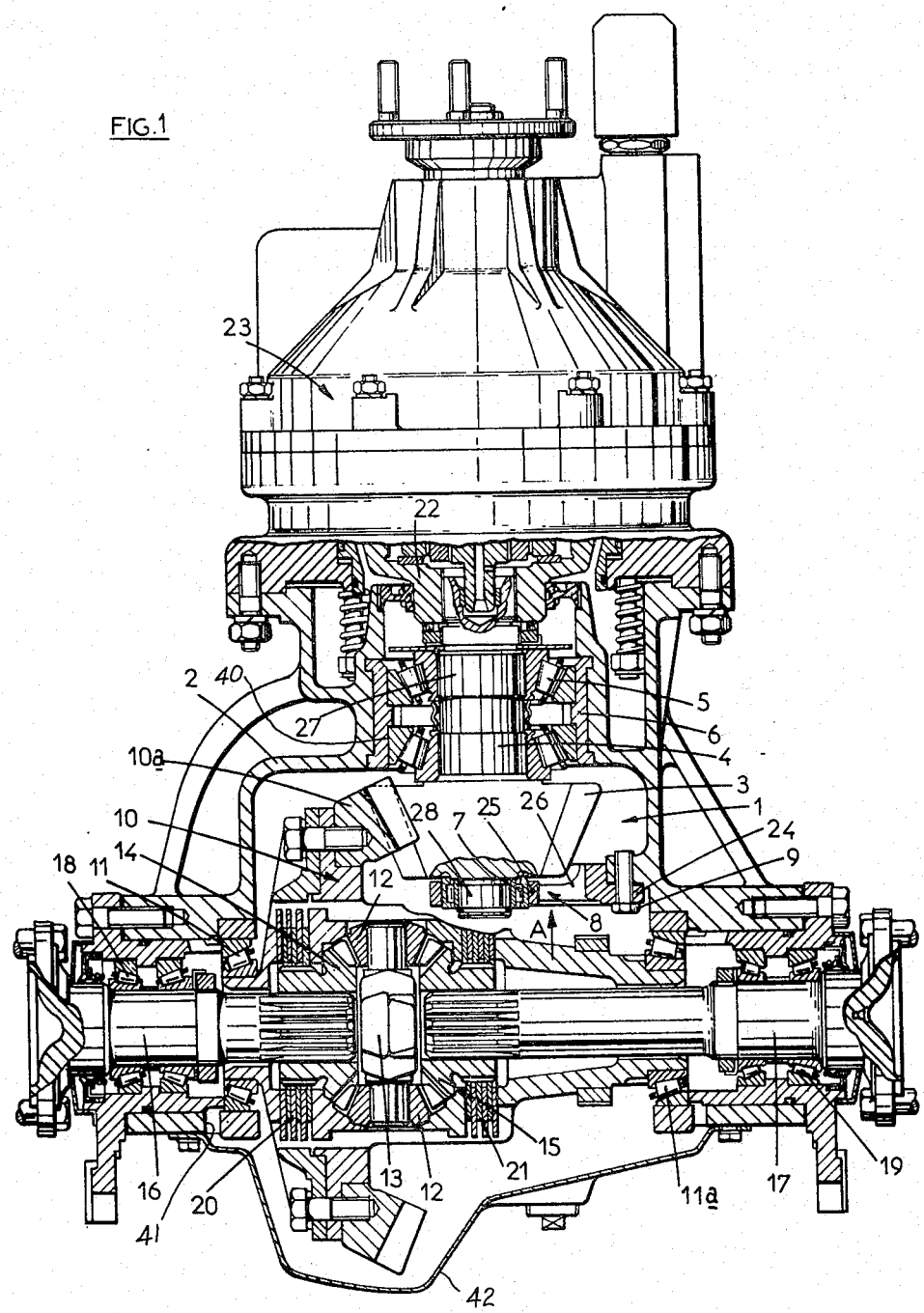
FIG. 1 is a plan view, partly in section, of one form of vehicle differential unit in accordance with the present invention and an associated overdrive unit.

As shown in FIG. 1, a vehicle differential unit 1 comprises a light alloy housing 2 in which a drive pinion 3 is straddle mounted on a shaft 4 supported by a first or outer bearing assembly 5 received in a first aperture 40 in cast iron insert 6 provided in the housing and a second or inner bearing assembly 7 carried by a detachable bearing support in the form of a component 8 which is secured to the housing by bolts 9.

The drive pinion 3 meshes with a crown wheel assembly 10 incorporating a crown wheel 10a and carried by bearings 11 and 11a mounted in the housing. Drive is transmitted from the crown wheel assembly via bevel pinions 12 mounted on a transverse shaft 13 to bevel gears 14 and 15 which are splined to the output shafts 16 and 17 of the differential unit. These output shafts are supported in the housing by detachable bearing assemblies 18 and 19.

The differential unit is of the "limited slip" type, clutch assemblies 20 and 21 being provided in the conventional manner in order to create a frictional resistance to any difference in the speed of rotation of the bevel gears and the crown wheel assembly.

The shaft on which the drive pinion 3 is mounted is connected to an output member 22 of an epicyclic overdrive unit indicated generally at 23.

Figure 2:
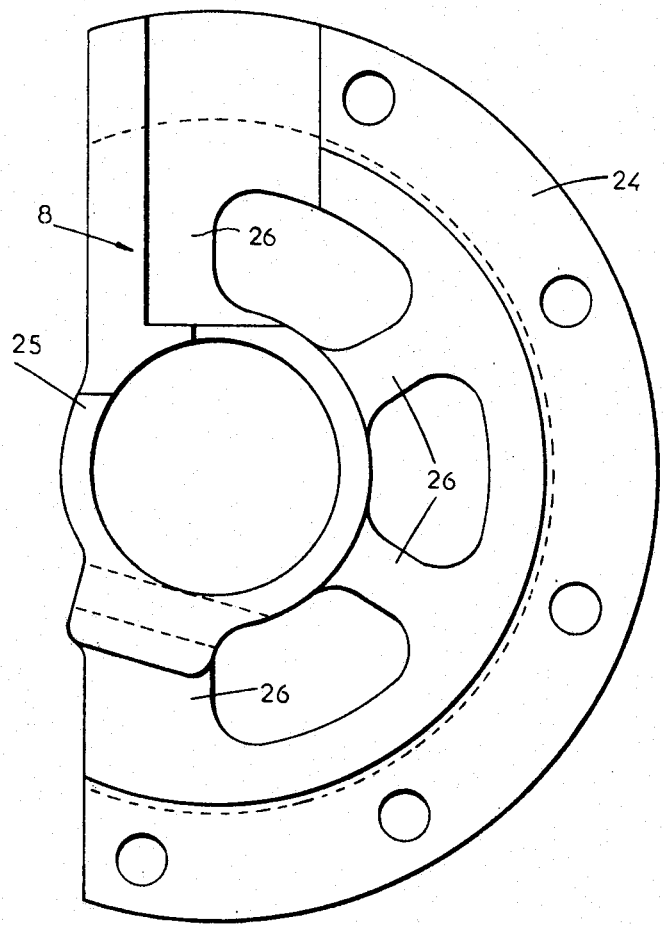
FIG. 2 is a view, in the direction of arrow A of FIG. 1, a bearing support used in the vehicle drive transmission unit shown in FIG. 1.

The detailed construction of the inner bearing assembly support component 8 is shown in FIG. 2. The component is of a segmentally shaped substantially flat form and comprises an outer arcuate portion 24 which is secured to the housing by bolts 9, and an annular portion 25 which carries the inner bearing assembly. The arcuate and annular portions are joined by a number of ribs 26.

Because of the relatively high coefficient of thermal expansion of light alloy, the support component 8 is made of cast iron in order to ensure that the inner bearing assembly 7 does not work loose during operation of the differential unit. The cast iron sheet 6 which supports the outer bearing assembly 5 is also provided in order to ensure the firm location of the outer bearing assembly.

The housing 2 is also provided with a second aperture 41 which is closed by a removable cover 42, the size of the second aperture being sufficiently large to allow the passage therethrough of the drive pinion 3 as will be described below.

By straddle mounting the drive pinion 3 in the manner described above, in which the inner bearing assembly is carried by a support component which is detachably secured to the housing, it is possible to mount the drive pinion in the housing in the following manner. With the cover 42 removed, the shaft 4 and drive pinion 3 are passed into the housing through the second aperture 41. A first or outer end portion 27 of the shaft 4 is then inserted into the outer bearing assembly 5 which has previously been pressed into the first aperture 40 in the insert 6. The inner or second end portion 28 of the shaft 4 is then introduced into the inner bearing assembly 7 carried by the bearing support 8 and the support 8 is then secured to the housing by the bolts 9. The remainder of the differential is then assembled and the cover 42 is then secured in position over the second aperture 41.

It will thus be seen that the drive pinion is not introduced into the housing via first the aperture which supports the outer bearing assembly. Indeed, as can be seen from FIG. 1, the internal diameter of insert 6 is appreciably less than the largest diametrial measurement of the drive pinion 3. Thus a saving in weight is effected and the assembly procedure is simplified.

Figure 3:
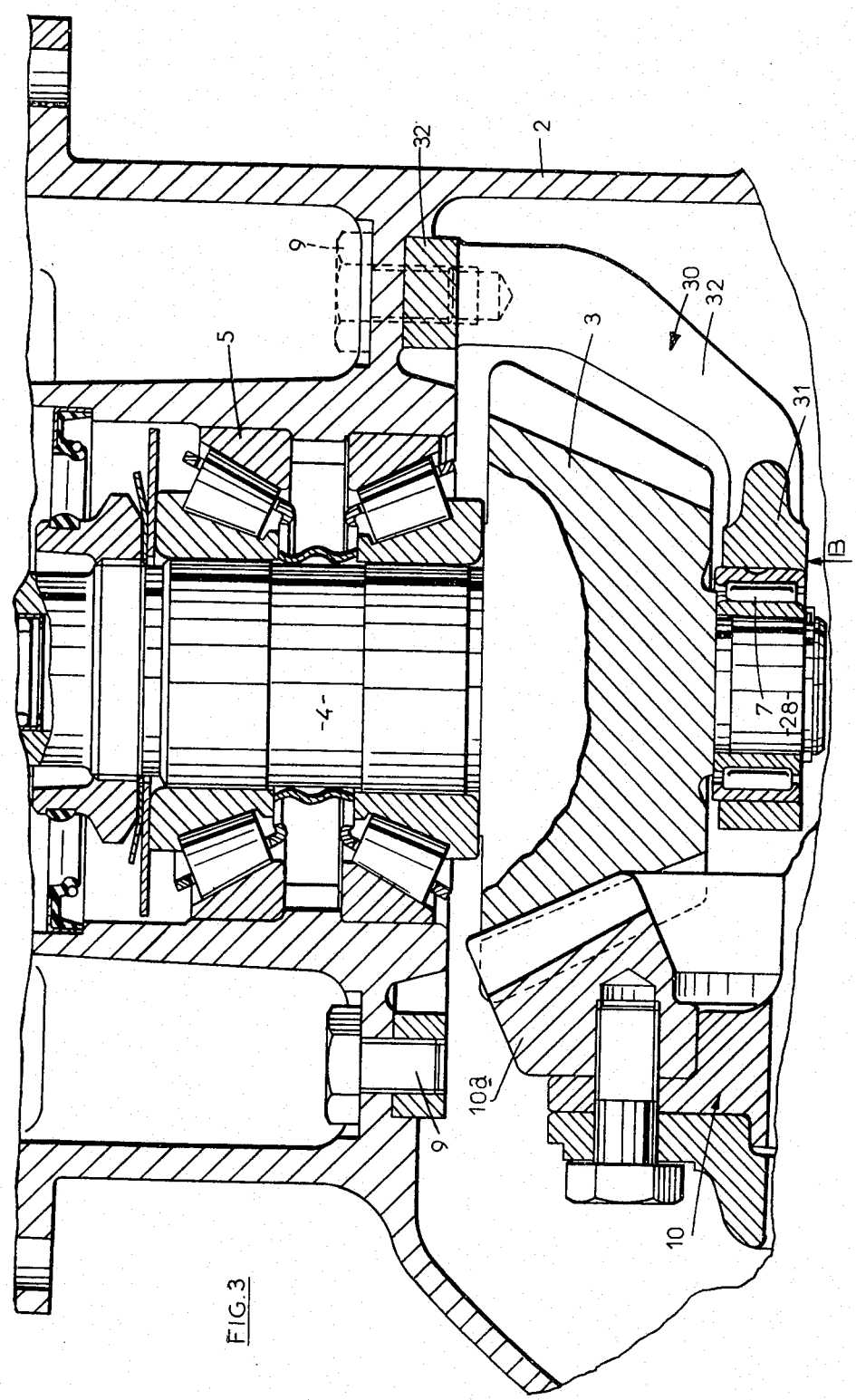
FIG. 3 is a sectional plan view of another form of vehicle differential unit in accordance with the present invention.

Part of an alternative form of vehicle differential unit in accordance with the present invention is shown in FIG. 3. The remainder of the differential unit is similar to that shown in FIG. 1 and the components shown in FIG. 3 which are similar to those shown in FIG. 1 have been similarly numbered. In the arrangement shown in FIG. 3, the housing 2 is formed from cast iron and the outer bearing assembly 5 is mounted directly in the housing.

Figure 4:
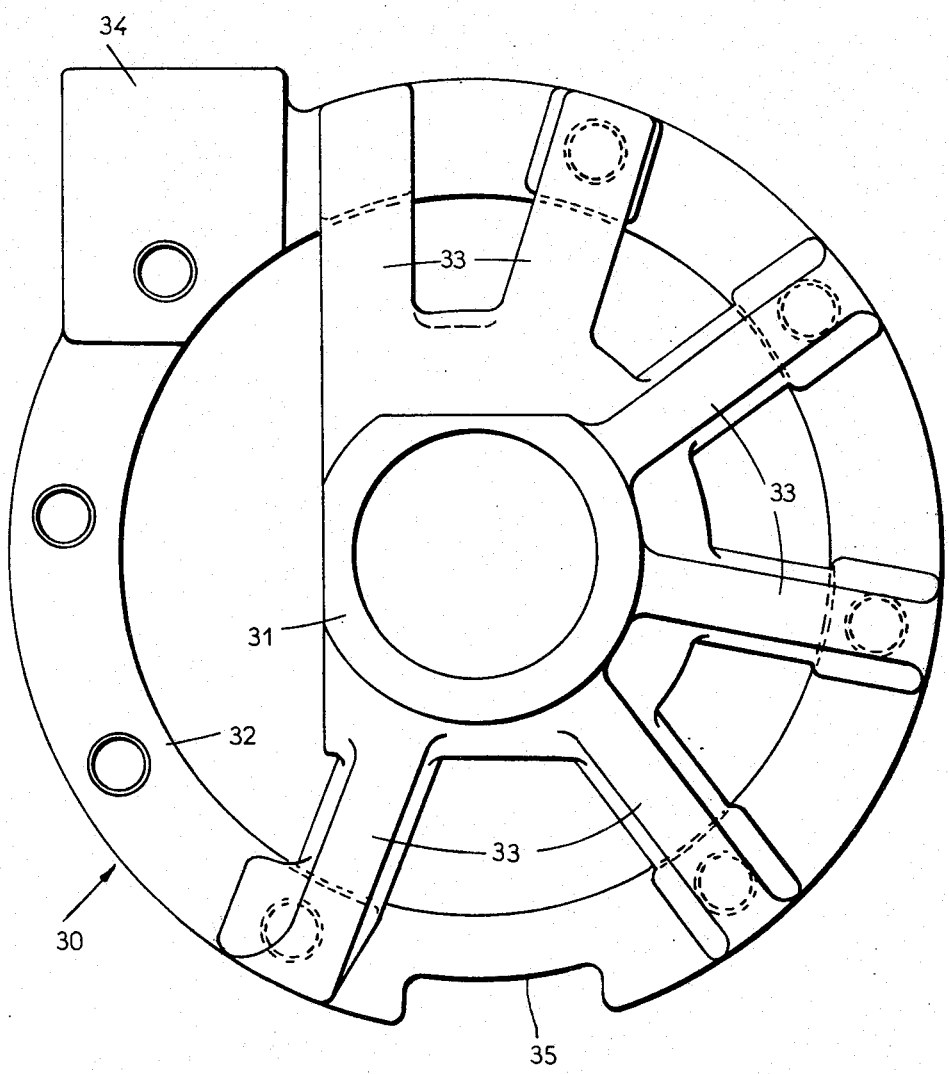
FIG. 4 is a view, in the direction of arrow B of FIG. 3, of a bearing support used in the vehicle differential unit shown in FIG. 3.

The second or inner end portion 28 of the shaft 4 is carried in a cast iron bearing support in the form of a component 30 shown in detail in FIG. 4. The component 30 comprises two annular portions 31 and 32 which are axially spaced relative to the pinion shaft 4 and are interconnected by a number of ribs 33. The inner annular portion 31 carries the inner bearing assembly 7 and the outer annular portion 32 is secured to the housing by bolts 9. A projection 34 is provided on the outer annular portion 32 in order to deflect oil from the vicinity of the crown wheel assembly towards the outer bearing assembly of the shaft 4 and a cut out 35 allows oil return from the outer bearing assembly.

As can be seen from FIGS. 3 and 4 the inner and outer annular portions are concentric and are axially spaced so that the inner annular portion 31 supports the inner bearing assembly on one side of the drive pinion and the outer annular portion 32 is secured to the housing on the other side of the drive pinion. The ribs 33 do not extend between the inner and outer annular portions in the vicinity of the crown wheel 10a in order to allow the crown wheel to mesh with the drive pinion 3. The arrangement shown in FIGS. 3 and 4 has the advantage that the support component 30 is secured to the housing by the continuous annular portion 32. This provides a stronger location of the inner bearing assembly than the segmentally shaped component 8 previously described.

The method of mounting the drive pinion in the housing is similar to that previously described with reference to FIGS. 1 and 2. The support component 30 being bolted to the housing after the first or outer end portion of the shaft 4 has been introduced into the outer bearing assembly.

Figure 5:
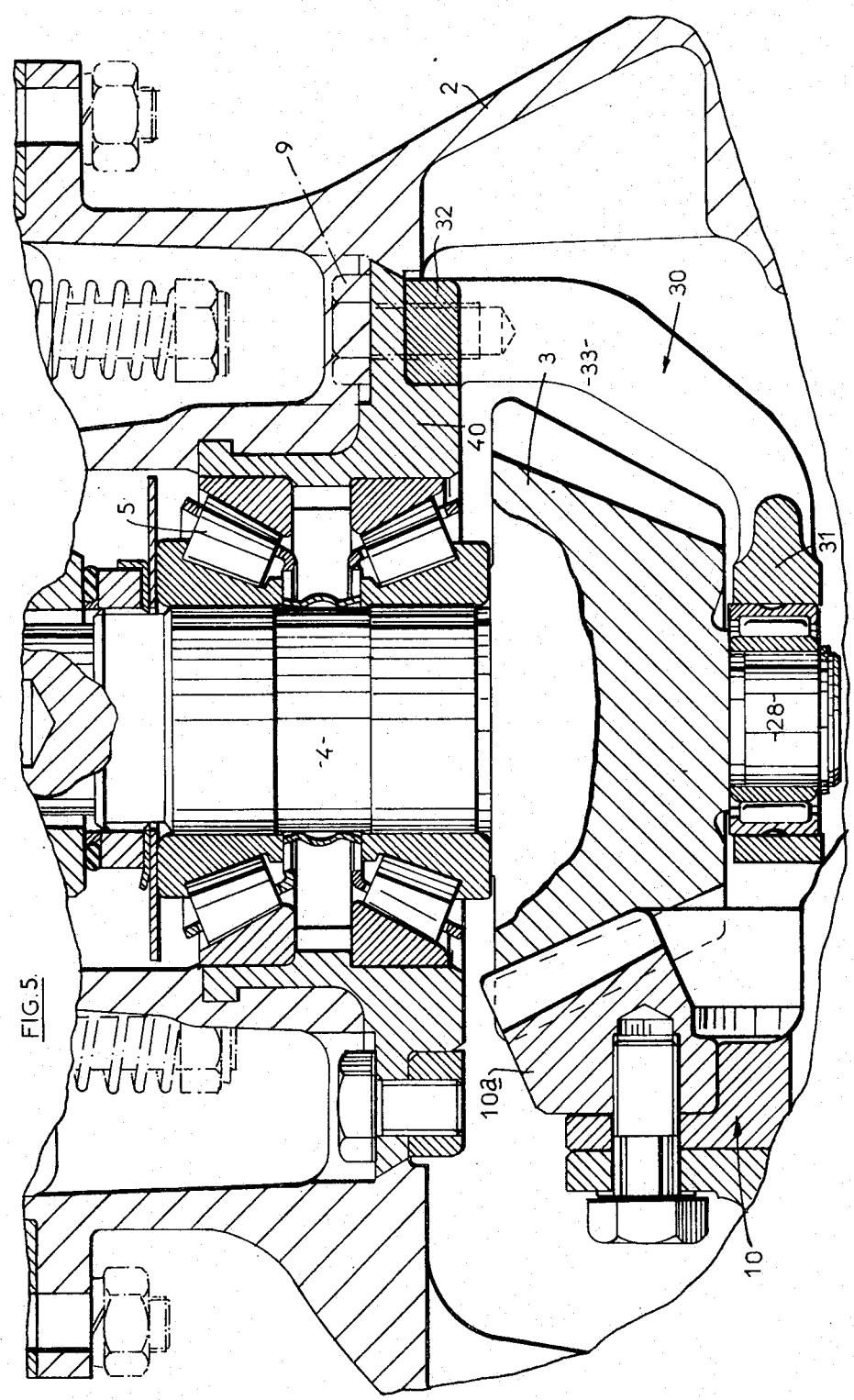
FIG. 5 is a plan view, partly in section, of part of a further form of vehicle differential unit in accordance with the present invention and an associated overdrive unit.

FIG. 5 shows a modification of the construction shown in FIGS. 3 and 4 in which similar components have been similarly numbered. The housing 2 shown in FIG. 5 is made of light alloy and the outer bearing assembly 5 is supported in a cast iron insert 40 in order to avoid the problems resulting from the relatively high coefficient of thermal expansion of light alloy, as previously described with reference to FIGS. 1 and 2. The cast iron support member 30 shown in FIG. 5 is bolted directly to the insert 40 in order to avoid the problems of differential thermal expansion which might occur were the support component bolted directly to the light alloy housing.

It will therefore be seen, that the present invention, by providing a vehicle differential unit in which the inner bearing assembly is carried in a component which is detachably secured to the housing, enables a significant saving in weight to be obtained and also simplifies the assembly procedure.

We claim:

1. A vehicle differential unit comprising a housing, first and second apertures in the housing, the second aperture being larger than the first aperture, an abutment surface on the housing located between said apertures and facing said second aperture; a removable cover for the second aperture; differential gearing in the housing and including a drive pinion mounted on a pinion shaft and spaced from the ends thereof so that the pinion is located between first and second end portions of the shaft, a crown wheel meshing with the drive pinion, a cage secured to the crown wheel, bevel pinions carried by the cage and output bevel gears meshing with the bevel pinions; an outer bearing assembly in said first aperture and in which the first end portion of the pinion shaft is supported, the first aperture being of insufficient size to allow the drive pinion to pass therethrough so that the first end portion of the shaft can only be mounted in said outer bearing by inserting the pinion and shaft into the housing through the second aperture which is of a size sufficient to pass the drive pinion; an inner bearing assembly for the second end portion of the shaft; a bearing support separate from the housing and having an aperture which receives said inner bearing assembly and an abutment surface facing said first aperture and engaged with said abutment surface on the housing, said engaged abutment surfaces being located in an arc around the rotary axis of the drive pinion shaft; releasable means securing the bearing support to the housing with said abutment surfaces in engagement so that the bearing support can be inserted into the housing through the second aperture and, after the first end portion of the pinion shaft has been received in the outer bearing assembly, the inner bearing assembly can be located on the second end portion of the shaft and the releasable means then engaged to secure the bearing support to the housing.

2. A vehicle differential unit according to claim 1 in which the bearing support is of a segmentally-shaped substantially flat form, the outer peripheral portion of the support being secured to the housing.

3. A vehicle differential unit according to claim 2 in which the bearing support is shaped like a major segment of a circle, the centre of the inner bearing assembly coinciding with the centre of the circular arc defining the outer periphery of the support.

4. A vehicle differential unit according to claim 2 in which the bearing support comprises an arcuate portion and an annular portion joined together by a number of ribs, the arcuate portion being secured to the housing and the annular portion carrying the inner bearing assembly.

5. A vehicle differential unit according to claim 1 in which the bearing support comprises two interconnected portions spaced axially of the pinion shaft, one portion carrying the inner bearing assembly and the other being secured to the housing.

6. A vehicle differential unit according to claim 5 in which the two portions are annular in form, the portions being interconnected by a number of ribs.

7. A vehicle differential unit according to claim 6 in which the axial spacing between the two portions of the bearing support is such that one portion carries the inner bearing assembly on one side of the drive pinion and the other portion is secured to the housing on the other side of the drive pinion.

8. A vehicle differential unit according to claim 6 in which the diameter of the first annular portion is greater than that of the second annular portion.

9. A vehicle differential unit according to claim 1, in which the outer bearing assembly is carried directly in the housing.

10. A vehicle differential unit according to claim 1 in which the housing is formed from light alloy, the bearing support is formed from a ferrous material and the outer bearing assembly is carried by a ferrous insert provided as part of the housing.

11. A vehicle differential unit according to claim 10 in which the bearing support is secured to the ferrous insert.

12. A vehicle differential unit according to claim 1 in which the bearing support is bolted to the housing.

* * * * *